(No Model.)
F. L. GREGORY.
LATHE CHUCK.
No. 327,791. Patented Oct. 6, 1885.
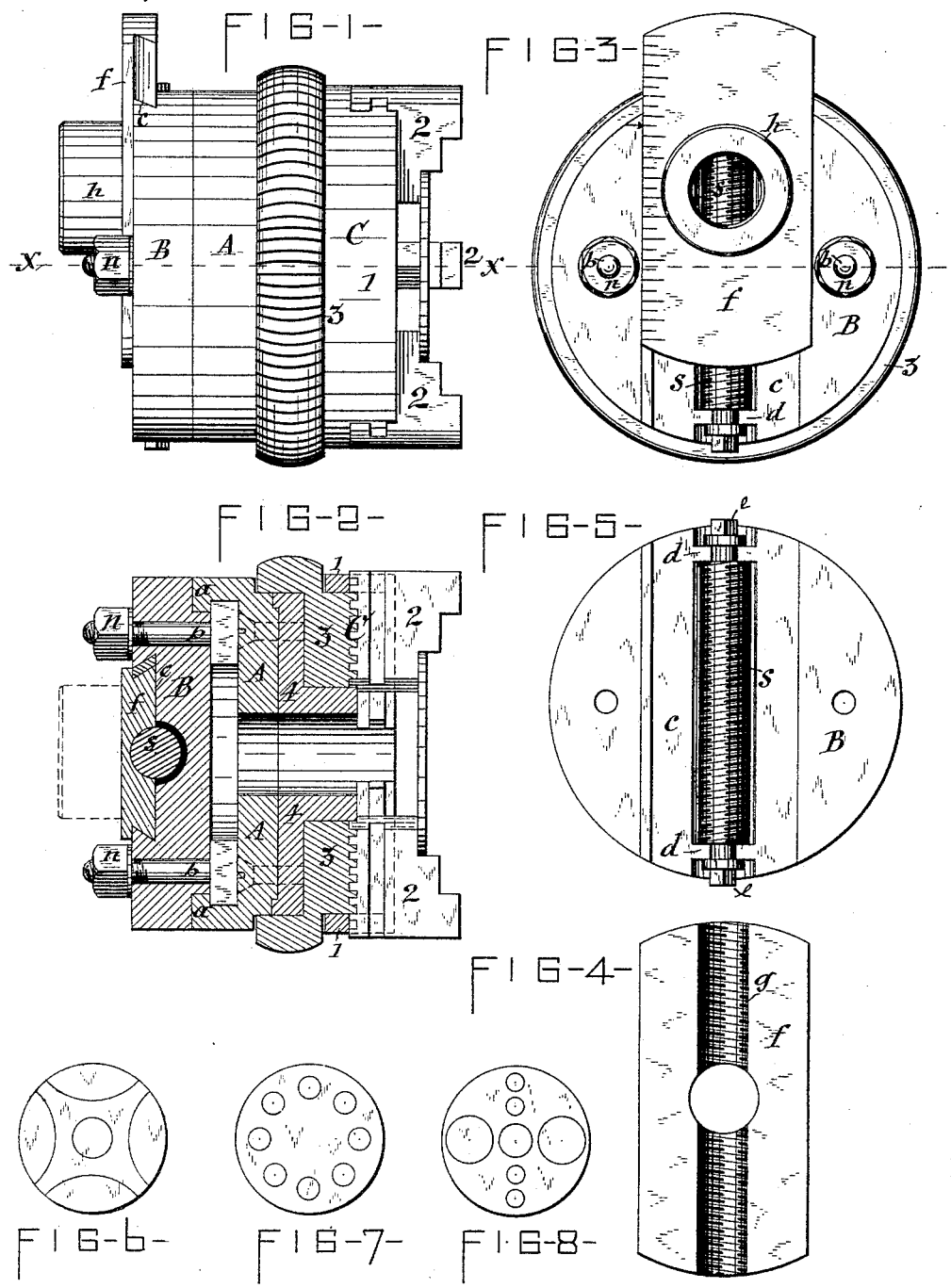
ATTEST—
Wm. C. Raymond
C. Bendixon
INVENTOR—
Fred Leon Gregory
per Dodge, Laass & Hay
Attys
N. PETERS, Photo-Lithographer, Washington, D. C.

UNITED STATES PATENT OFFICE.

FRED LEON GREGORY, OF NIAGARA FALLS, NEW YORK.

LATHE-CHUCK.

SPECIFICATION forming part of Letters Patent No. 327,791, dated October 6, 1885.

Application filed April 20, 1885. Serial No. 162,734. (No model.)

*To all whom it may concern:*

Be it known that I, FRED LEON GREGORY, of Niagara Falls, in the county of Niagara, in the State of New York, have invented new and useful Improvements in Chucks, of which the following, taken in connection with the accompanying drawings, is a full, clear, and exact description.

This invention relates to the class of chucks designated "eccentric chucks," and which are employed for shifting the object on the clutch so as to bring into the axial line of the lathe other points than that on which said object was turned.

The invention consists in a novel combination, with a chuck, of a plate pivoted on the chuck concentric with the axis thereof, and clamped adjustably thereon, a slide arranged to be movable laterally or radially on said plate, and provided with a hub for attachment to the mandrel, and an adjusting-screw for setting said slide in its required position in relation to the axis of the chuck, all as hereinafter more fully explained, and specifically set forth in the claims.

In the annexed drawings, Figure 1 is a side view of my invention, showing the chuck held eccentric in relation to the mandrel. Fig. 2 is a longitudinal section on line $x$ $x$, Fig. 1. Fig. 3 is a rear end view. Figs. 4 and 5 are detached face views of the slide and that part of the chuck to which said slide is connected; and Figs. 6, 7, and 8 illustrate specimens of work performed in connection with a chuck provided with my invention.

Similar letters of reference indicate corresponding parts.

C represents the chuck proper, which may be either a lathe-chuck or drill-chuck, and may have its jaws either universally or independently adjustable, and of any well-known construction. Said chuck is in this case represented to consist of a face-plate, 1, having radial grooves, in which the jaws 2 slide. A plate, 3, back of the face-plate is provided with a scroll, by which it engages ribs or projections on the back of the jaws. A plate, 4, on the hub of the face-plate 1, and bearing on the scroll-plate 3, confines the latter in the chuck. By revolving said scroll-plate the jaws are caused to move simultaneously toward and from the center of the chuck.

To the back plate, 4, of the chuck C, I rigidly secure a plate, A, either by bolting or riveting it thereon, or forming it integral therewith. This plate A, I provide with a rearwardly-projecting annular flange, $a$, which is undercut on its inner side, and to the back of said plate I connect another plate, B, which I pivot concentric with the axis of the chuck by means of bolts $b$ $b$, set with their heads against the back of the plate A, and with said heads extending into the recessed or undercut portion of the flange $a$, the screw-threaded shanks of the bolts extending through holes in the plate B, and having on their ends nuts $n$ $n$, by which to clamp the plate B in its position, so as to prevent its turning on the plate A, when desired.

The back of the plate B is provided with a diametric groove, $c$, the two walls of which are dovetailed or undercut, and in this groove slides a plate, $f$, having correspondingly dovetailed side edges. In the groove $c$, at or near the ends thereof, are fixed journal-bearings $d$ $d$, and in said bearings is journaled a screw, $s$, the ends of which are squared or otherwise adapted for the application of either a wrench or screw-driver by which to turn said screw.

The face of the slide $f$, adjacent to the groove $c$, is formed with a half-nut, $g$, with which the screw $s$ engages. From the back of the slide $f$, at the center thereof, projects the hub $h$, by which to attach said slide to the mandrel or live-spindle of the lathe.

By means of a chuck mounted on the mandrel by my improved attachments, as hereinbefore described, various ornamental work can be produced on the face of the article held by the jaws of the chuck; or a series of holes can be drilled in said object at various points, equidistant or variously distant from the center thereof, as illustrated in Figs. 6, 7, and 8 of the drawings. This is effected by turning the adjusting-screw $s$ until the chuck proper, C, is carried radially out of the axial line of the lathe a distance equal to that between the center of the object held on the chuck and the center of the hole to be drilled or scroll to be described outside of the center of said object. Then the nuts $n$ $n$ are to be loosened and the chuck C turned to bring in line with the dead-spindle or axis of the lathe the center of the hole or scroll to be cut in the object held on the chuck, and then the chuck is retained in said position by tightening the clamping-nuts n n. To facilitate the aforesaid adjustment, the slide f and back of the plate B, and also the adjacent outer edges of the plates B and A, may be provided with graduated scales by which to gage the movement of said parts, as represented in Fig. 3 of the drawings.

I am aware that prior to my present invention lathe-chucks have been mounted on slides, by which they were attached to the mandrel of the lathe, and which permitted the chuck to be shifted bodily radially from the axis of the lathe and set for eccentric work; hence I do not claim, broadly, an eccentric chuck embodying the aforesaid features; but

What I claim as new, and desire to secure by Letters Patent, is—

1. The combination, with a chuck, of a plate pivoted on the chuck concentric with the axis thereof, and clamped adjustably thereon, a slide arranged to be movable radially on said plate, and provided with a hub for attachment to the mandrel, and an adjusting-screw for setting said slide in its required position in relation to the axis of the chuck, substantially as described and shown.

2. In combination with a chuck, the plate A, rigidly attached thereto and provided with the undercut annular flange $a$, the bolts $b$, having their heads extending into the undercut portion of said flange, the plate B, provided with holes for the reception of the bolts $b$ $b$, and with the diametrical groove $c$ and bearings $d$ $d$ in said groove, the screw $s$, having journals $e$ $e$ in said bearings, and the slide $f$, provided with the half-nut $g$ and with the hub $h$, substantially as described and shown.

In testimony whereof I have hereunto signed my name and affixed my seal, in the presence of two attesting witnesses, at Syracuse, in the county of Onondaga, in the State of New York, this 7th day of April, 1885.

FRED LEON GREGORY. [L. S.]

Witnesses:
 FREDERICK H. GIBBS,
 C. BENDIXON.